United States Patent [19]

Brines et al.

[11] Patent Number: 4,499,159

[45] Date of Patent: Feb. 12, 1985

[54] X-RAY IMAGE CONVERTERS UTILIZING RARE EARTH OXYHALIDE PHOSPHORS

[75] Inventors: Marjorie J. Brines, South Euclid; Jacob G. Rabatin, Montville, both of Ohio

[73] Assignee: General Electric Company, Schenectady, N.Y.

[21] Appl. No.: 600,066

[22] Filed: Apr. 13, 1984

[51] Int. Cl.$^3$ ............... G01J 1/58; C09K 11/475
[52] U.S. Cl. ............... 428/691; 250/483.1; 250/486.1; 250/327.2; 252/301.4 H; 428/690; 428/913; 430/966; 430/967
[58] Field of Search ............... 252/301.4 H; 250/483.1, 250/486.1, 327.2; 428/690, 691, 913; 430/966, 967

[56] References Cited

U.S. PATENT DOCUMENTS

| | | | |
|---|---|---|---|
| 3,795,814 | 3/1974 | Rabatin | 250/483.1 X |
| 3,872,309 | 3/1975 | De Belder et al. | 252/301.4 H X |
| 3,996,472 | 12/1976 | Rabatin | 252/301.4 H X |
| 4,070,583 | 1/1978 | Rabatin | 252/301.4 H X |

FOREIGN PATENT DOCUMENTS 183308  8/1966  U.S.S.R. ............... 252/301.4 H

*Primary Examiner*—Jack Cooper
*Attorney, Agent, or Firm*—John F. McDevitt; Philip L. Schlamp; Fred Jacob

[57] ABSTRACT

Oxyhalides of lanthanum and gadolinium and coactivated with thulium ion and further containing an impurity ion and a second coactivator selected from praseodymium and neodymium, including mixtures thereof, exhibit reduced quantum noise when employed in X-ray image converter devices. In the preferred embodiments, small but effective amounts of ytterbium ion can also be incorporated into the phosphor material to reduce afterglow and a multilayer X-ray screen construction is disclosed employing the improved phosphors.

8 Claims, 1 Drawing Figure

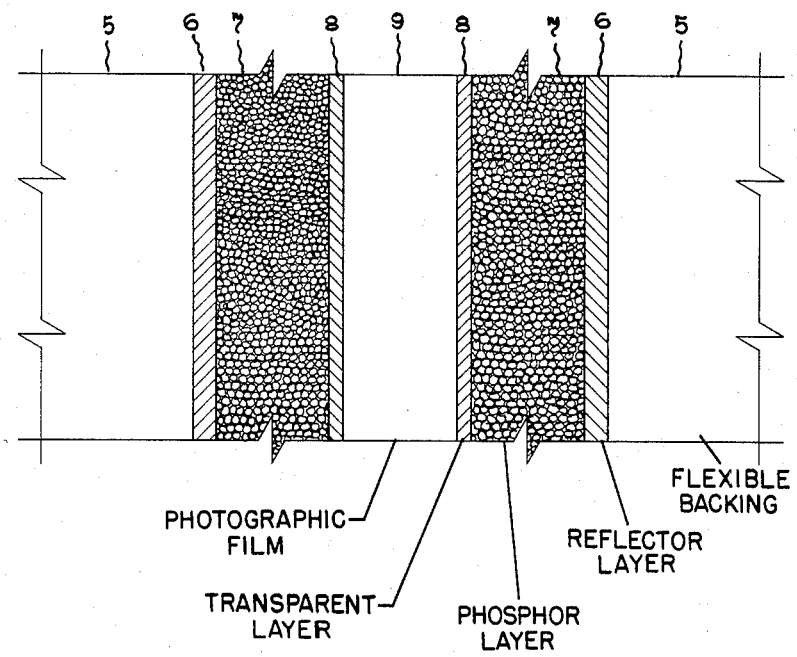

X-RAY IMAGE CONVERTERS UTILIZING RARE EARTH OXYHALIDE PHOSPHORS

REFERENCE TO RELATED APPLICATION

In prior application Ser. No. 450,875, now U.S. Pat. No. 4,481,416, filed Dec. 20, 1982 in the name of Jacob G. Rabatin, and also assigned to the assignee of the present invention, there is disclosed a novel class of thermoluminescent type coactivated rare earth oxyhalide phosphors and X-ray image converters utilizing said phosphors. Said phosphors comprise oxyhalides of lanthanum, gadolinium and lutetium, coactivated with a first activator selected from bismuth and samarium to provide the color of light emission and a second coactivator which increases the amount of stored energy in a stored radiographic latent image. Suitable coactivator ions are selected from terbium and praseodymium in an amount from a small but effective amount up to about 0.002 mole per mole of the phosphor.

BACKGROUND OF THE INVENTION

X-ray image converters utilizing luminescent materials have long been known, such as radiographic intensifier screens, fluoroscopic screens, and X-ray image intensifier tubes. For example, in issued U.S. Pat. No. 3,795,814 there is disclosed lanthanum and gadolinium oxyhalide luminescent materials activated with thulium ion as efficient materials to convert X-ray radiation to ultraviolet and visible light. Various image converter devices utilizing said luminescent materials are also described therein for conversion of the X-rays to blue color emission, including a multi-layer type X-ray screen construction for use with photographic film to record the light image. In more recent U.S. Pat. No. 3,996,472, also assigned to the present assignee, various rare earth oxyhalides coactivated with terbium and a second activator selected from zirconium and hafnium exhibit superior thermoluminescent behavior in radiation dosimeters when subjected to heat stimulation.

It has now become desirable to produce lower speed rare earth oxyhalide phosphors activated with thulium ion for X-ray screen application. In this product application, a modified phosphor material is desired exhibiting reduced quantum noise with speeds of about 4 times that of the conventional PAR screens. Known thulium activated lanthanum oxybromide phosphors exhibiting such reduced efficiency can be produced with lower thulium activator levels and further containing ytterbium ion. Such phosphor variation produces a broad range of scintillation intensities, however, with the number of scintillation events being distributed over a broad range of scintillation intensity values. This is undesirable because high quantum noise is produced giving rise to highly mottled film images. Lower concentrations of thulium activator ion are also apparently not uniformly distributed in the phosphor host lattice so that some portions of the lattice convert the absorbed X-rays more efficiently while other lattice regions convert the absorbed radiation less efficiently to light photons. The presence of the ytterbium ion also apparently does not alter this aspect of the light emission although having been found to reduce afterglow. Further modification of these phosphor materials to impart greater uniformity in the scintillation intensities would thereby provide significant improvement for the desired product application as well as for still other X-ray image converter devices.

SUMMARY OF THE INVENTION

It has now been discovered, surprisingly, that incorporation of certain impurity ions into the phosphor host lattice in controlled amounts produces relatively uniform scintillation intensities. More particularly, the partial substitution of rare earth ion in the phosphor host lattice with another rare earth ion selected from praseodymium and neodynium result in more uniform scintillation intensities with the absorbed X-rays being more uniformly converted to light at reduced quantum noise levels. Said replacement rare earth ions can be further characterized as non-activators which enable the absorbed X-rays to be converted to approximately the same number of light photons throughout the phosphor host lattice. While the exact mechanism whereby the desired improvement takes place has not been fully investigated, it is believed attributable to the combined effect of different phenomena. It first appears that praseodymium and neodynium ions form associate groups with the thulium activator ion during the phosphor synthesis that lead to a more uniform distribution of said thulium activator ion in the phosphor lattice. The praseodymium and neodynium ions thereafter interact with the now more uniformly distributed thulium activator ion in the phosphor lattice to help quench light emission except in a narrow scintillation intensity range. Such quenching action, attributable to said impurity ions, is sufficiently intense to permit higher thulium activator ion levels in the phosphor material which also favors its more uniform distribution in the phosphor lattice.

The superior performance X-ray image converter of the present invention employs phosphor crystals having the general formula:

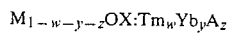

$$M_{1-w-y-z}OX:Tm_wYb_yA_z$$

wherein
M is one or more of La and Gd,
X is one or more of Cl and Br,
w is from about 0.0001 to about 0.01 mole per mole of phosphor,
y is from zero to about 0.01 mole per mole of phosphor,
z is from about 0.0001 to about 0.01 mole per mole of phosphor, and
A is one or more of Pr and Nd,
said phosphor exhibiting relatively uniform ultraviolet emission scintillation intensities when excited by relatively equal energy X-ray photons from a radiation source in the 40–120 KVp range for reduced quantum noise. The preparation of said improved phosphor material can be achieved in the conventional manner by heating a mixture of the rare earth oxides and the selected ammonium halide along with an alkali metal halide flux, such as disclosed in U.S. Pat. No. 3,591,516, which is also assigned to the assignee of the present invention.

These phosphor crystals are customarily applied as a layer in the conventional manner for use in various X-ray image converter devices and include having the phosphor supported on a base member as the light image producing component of X-ray image converter devices. In a preferred X-ray screen construction of the present invention, the modified phosphors are employed as a pair of phosphor layers which are positioned on each side of a double emulsion photographic film to form a sandwich configuration. Said preferred multi-layer X-ray screens further incorporate a UV absorption dye in the otherwise transparent layer of the photographic film member to cooperate with the present phosphor materials in reducing the amount of emitted radiation which can cross over to the more remote emulsion layer. Cross over is undesirable by reason of widening the recorded image which produces blurring due to lack of alignment between the image formed on the nearest emulsion layer and the cross over image produced on the more remote emulsion layer. Said preferred multi-layer X-ray screen construction thereby comprises:

(a) a photographic film having emulsion layers disposed on each major surface and separated by an optically transparent support,
(b) a pair of phosphor layers being positioned on each side of said photographic film to form a sandwich construction, and
(c) each of said phosphor layers comprising phosphor crystals supported on a base member, said phosphor crystals having a general formula:

$$M_{1-w-y-z}OX:Tm_wYb_yA_z$$

wherein
M is one or more of La and Gd,
X is one or more of Cl and Br
w is from about 0.0001 to about 0.01 mole per mole of phosphor
y is from zero to about 0.01 mole per mole of phosphor
z is from about 0.0001 to about 0.01 mole per mole of phosphor, and
A is one or more of Pr and Nd,
said phosphor exhibiting relatively uniform ultraviolet emission scintillation intensities when excited by relatively equal energy X-ray photons from a radiation source in the 40–120 KVp range for reduced quantum noise. Understandably, the present modified phosphors produce a light image with better optical resolution than one recorded upon the associated photographic film with prior art phosphors.

BRIEF DESCRIPTION OF THE DRAWING

In the accompanying drawing there is shown a cross-sectional view of a multi-layer X-ray screen utilizing the present modified phosphor material along with a dye system to absorb ultraviolet and light emission which otherwise crosses over to the remote emulsion layer.

DESCRIPTION OF THE PREFERRED EMBODIMENTS

Referring to the accompanying drawing, there is depicted a preferred multi-layer X-ray screen construction utilizing a double emulsion photographic film 9 which is sandwiched between two X-ray intensifying screens. The screens are constructed in a conventional manner with a flexible backing 5 which supports a pair of reflecting layers 6, a pair of phosphor layers 7 to which this invention relates, and a pair of transparent layers 8. A known UV dye is incorporated in the transparent support layer of said double emulsion photographic film 9 to help reduce cross over through said support as above previously indicated. It is to be pointed out that the particular construction of said X-ray screen being described is merely exemplary and thereby not intended to be a limitation on the invention which resides in the modified phosphor material improving overall device performance. Accordingly, there is provided in Table I below representative examples demonstrating said improved optical performance as compared with the conventional phosphor materials. The reported measurements were obtained upon lanthanum oxybromide phosphors having the listed levels of activator and impurity ions at a phosphor particle size averaging approximately 10 microns diameter.

TABLE I

| Example | Activator and Impurity Concentration (Mole/Mole Phosphor) | Relative Brightness | Quantum Noise |
|---|---|---|---|
| 1 | .003 Tm | 50 | High |
| 2 | .0001 Tm | 35 | High |
| 3 | .0005 Tm, .002 Yb | 38 | High |
| 4 | .0005 Tm, .004 Yb | 32 | High |
| 5 | .0005 Tm, .004 Nd | 27 | Low |
| 6 | .0005 Tm, .004 Pr | 14 | Low |
| 7 | .0005 Tm, .001 Yb, .001 Pr | 22 | Low |
| 8 | .001 Tm, .0005 Yb, .0005 Pr | 32 | Low |

As can be noted from the above reported reduction in quantum noise for phosphor materials of the present invention (examples 5–8), the presence of either praseodymium or neodymium ion in said phosphor produces about equal improvement. The further incorporation of ytterbium as an additional impurity ion in said phosphor has not been found to modify this improvement.

It will be apparent from the foregoing description that novel phosphor materials and X-ray image converter devices utilizing said phosphor materials have been disclosed exhibiting significant performance improvement. It should be appreciated from said foregoing description, however, that comparable improvement can be achieved with phosphor compositions other than the above specifically disclosed. For example, partial substitution of chloride ion for bromide ion in the thulium-activated oxyhalide phosphor constituent should not materially lower the principal advantage found. It is intended to limit the present invention, therefore, only by the scope of the following claims.

What we claim as new and desire to secure by Letters Patent of the United States is:

1. An improved X-ray image converter having phosphor crystals supported on a base member, said phosphor crystals having the general formula:

$$M_{1-w-y-z}OX:Tm_wYb_yA_z$$

wherein
M is one or more of La and Gd,
X is one or more of Cl and Br,
w is from about 0.0001 to about 0.01 mole per mole of phosphor,
y is from zero to about 0.01 mole per mole of phosphor
z is from about 0.0001 to about 0.01 mole per mole of phosphor, and
A is one or more of Pr and Nd,
said phosphor exhibiting relatively uniform ultraviolet emission scintillation intensities when excited by relatively equal energy X-ray photons from a radiation source in the 40–120 KVp range and a lower quatum noise than said phosphor absent A.

2. An improved X-ray image converter as in claim 1 wherein the phosphor is lanthanum oxyhalide.

3. An improved X-ray image converter as in claim 2 wherein the phosphor is lanthanum oxybromide.

4. An improved X-ray image converter as in claim 1 which further includes photographic film means to record the light image produced by said phosphor.

5. An improved X-ray image converter as in claim 1 comprising an X-ray screen.

6. An improved X-ray screen as in claim 5 wherein said photographic film further includes an ultraviolet absorbing dye to help reduce crossover through said support.

7. An improved X-ray screen as in claim 5 which further includes light reflecting layers positioned adjacent the exteriormost major surfaces of the phosphor layers.

8. An improved multi-layer X-ray screen construction which comprises:

(a) a photographic film having emulsion layers disposed on each major surface and separated by an optically transparent support, (b) a pair of phosphor layers being positioned on each side of said photographic film to form a sandwich construction, and (c) each of said phosphor layers comprising phosphor crystals supported on a base member, said phosphor crystals having the general formula:

$$M_{1-w-y-z}OX:Tm_w Yb_y A_z$$

wherein
M is one or more of La and Gd,
X is one or more of Cl and Br
W is from about 0.0001 to about 0.01 mole per mole of phosphor,
Y is from zero to about 0.01 mole per mole of phosphor
Z is from about 0.0001 to about 0.01 mole per mole of phosphor, and
A is one or more of Pr and Nd,
said phosphor exhibiting relatively uniform ultraviolet emission scintillation intensities when excited by relatively equal energy X-ray photons from a radiation source in the 40–120 KVp range and a lower quantum noise, than said phosphor absent A.

* * * * *

UNITED STATES PATENT AND TRADEMARK OFFICE
CERTIFICATE OF CORRECTION

PATENT NO. : 4,499,159
DATED : February 12, 1985
INVENTOR(S) : Marjorie J. Brines et al.

It is certified that error appears in the above-identified patent and that said Letters Patent are hereby corrected as shown below:

Claim 8, in line 16 change "W" to read --- w ---; in line 18 change "Y" to read --- y ---; and in line 19 change "Z" to read --- z ---.

Signed and Sealed this

Second Day of July 1985

[SEAL]

Attest:

DONALD J. QUIGG

*Attesting Officer*     *Acting Commissioner of Patents and Trademarks*